(12) United States Patent
Bhattacharya et al.

(10) Patent No.: US 12,553,100 B2
(45) Date of Patent: Feb. 17, 2026

(54) HIGH STRENGTH GRADIENT STEELS

(71) Applicant: GM GLOBAL TECHNOLOGY OPERATIONS LLC, Detroit, MI (US)

(72) Inventors: Diptak Bhattacharya, Royal Oak, MI (US); Hassan Ghassemi-Armaki, Northville, MI (US); Andrew Clay Bobel, Troy, MI (US); Anil K. Sachdev, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 428 days.

(21) Appl. No.: 18/076,693

(22) Filed: Dec. 7, 2022

(65) Prior Publication Data
US 2024/0191318 A1 Jun. 13, 2024

(51) Int. Cl.
*B32B 15/01* (2006.01)
*C21D 8/02* (2006.01)
*C21D 8/0221* (2026.01)
*C21D 9/46* (2006.01)
*C22C 38/02* (2006.01)
(Continued)

(52) U.S. Cl.
CPC .............. *C21D 9/46* (2013.01); *B32B 15/011* (2013.01); *C21D 8/0205* (2013.01); *C21D 8/0236* (2013.01); *C22C 38/02* (2013.01); *C22C 38/04* (2013.01); *C22C 38/06* (2013.01); *C21D 2211/001* (2013.01); *C21D 2211/002* (2013.01); *C21D 2211/005* (2013.01); *C21D 2211/008* (2013.01)

(58) Field of Classification Search
None
See application file for complete search history.

(56) References Cited

U.S. PATENT DOCUMENTS 11,473,164 B2 * 10/2022 Nishio ..................... C23C 2/40
2019/0390295 A1 12/2019 Nakagawa et al.
2022/0127709 A1 4/2022 Yokoyama et al.

FOREIGN PATENT DOCUMENTS

CN 110475891 A 11/2019
CN 118144373 A 6/2024
(Continued)

OTHER PUBLICATIONS

First Office Action Chinese Patent Application No. 202311055033.1 issued Dec. 30, 2025, with correspondence from China Patent Agent (H.K.) Ltd summarizing Office Action and machine translation; 19 pages.

*Primary Examiner* — Daniel J. Schleis
(74) *Attorney, Agent, or Firm* — Harness, Dickey & Pierce, P.L.C.

(57) ABSTRACT

A gradient steel includes a first layer, a second layer near a first surface of the first layer, and a third layer near a second surface of the first layer. The first layer includes a first ferrite phase volume. The second and third layers include a second ferrite phase volume greater than the first ferrite phase volume. The gradient steel may also include a fourth layer near the second layer and a fifth layer near the third layer. The fourth and fifth layers may each include a third ferrite phase volume greater than the second ferrite phase volume. The gradient steel may also include a sixth layer near the fourth layer and a seventh layer near the fifth layer. The sixth and seventh layers may each include a fourth ferrite phase volume greater than the third ferrite phase volume.

17 Claims, 1 Drawing Sheet

(51) Int. Cl.
*C22C 38/04* (2006.01)
*C22C 38/06* (2006.01)

(56) References Cited

FOREIGN PATENT DOCUMENTS

| | | |
|---|---|---|
| DE | 102023121015 A1 | 6/2024 |
| WO | WO-2017185319 A1 | 11/2017 |
| WO | WO-2017185320 A1 | 11/2017 |

* cited by examiner

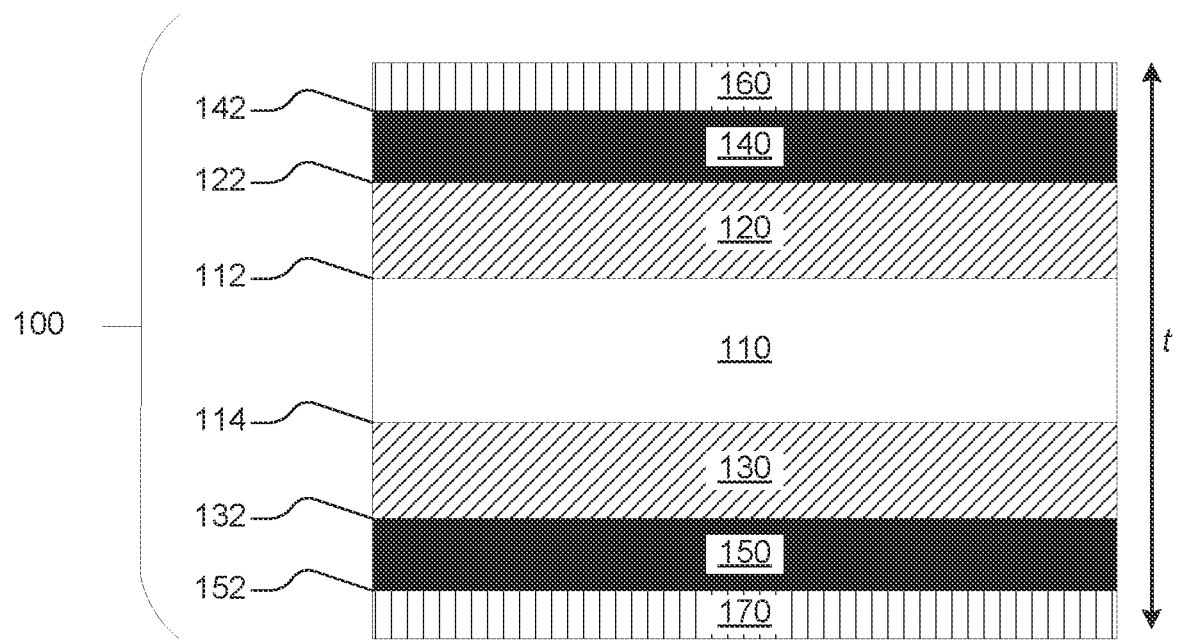

HIGH STRENGTH GRADIENT STEELS

INTRODUCTION

This section provides background information related to the present disclosure which is not necessarily prior art.

Steel components are prevalent in various industries and applications, including general manufacturing, construction equipment, automotive or other transportation industries, home or industrial structures, and the like. For example, steel components are often used for forming load-bearing components, like door beams, which usually require high strength materials. Continual improvement in formability, bendability, hole expansion, coatability, weld toughness, liquid metal embrittlement of coated steels during welding, and/or crashworthiness of steel components are desirable.

SUMMARY

This section provides a general summary of the disclosure, and is not a comprehensive disclosure of its full scope or all of its features.

The present disclosure provides a high strength gradient steel, including a central high-retained austenite layer having a high ultimate tensile strength disposed between one or more other layers having smaller ultimate tensile strengths, and methods of forming the same.

In various aspects, the present disclosure provides a gradient steel that includes a first layer, a second layer, and a third layer. For example, the first layer may have a first surface and a second surface parallel with the first surface and may include a ferrite phase in a first volume. The second layer may be disposed adjacent to the first surface of the first layer, and the third layer may be disposed adjacent to the second surface of the first layer. The second and third layers may each include ferrite phase in a second volume that is greater than the first volume.

In one aspect, the gradient steel may further include a fourth layer and a fifth layer. For example, the fourth layer may be disposed adjacent to a surface of the second layer that faces away from the first layer, and the fifth layer may be disposed adjacent to a surface of the third layer that faces away from the first layer. The fourth and fifth layers may each include ferrite phase in a third volume that is greater than the second volume.

In one aspect, the gradient steel may further include a sixth layer and a seventh layer. For example, the sixth layer may be disposed adjacent to a surface of the fourth layer that faces away from the first layer, and the seventh layer may be disposed adjacent to a surface of the fifth layer that faces away from the first layer. The sixth and seventh layers may each include a ferrite phase in a fourth volume that is greater than the third volume.

In one aspect, the first volume may be less than or equal to about 5 vol. %, the second volume may be greater than or equal to about 30 vol. % to less than or equal to about 40 vol. %, the third volume may be greater than or equal to about 70 vol. % to less than or equal to about 90 vol. %, and the fourth volume may be about 100 vol. %.

In one aspect, the first layer may further include a bainite/tempered martensite phase and a retained austenite phase. The first layer may include greater than or equal to about 50 vol. % to less than or equal to about 70 vol. % of the bainite/tempered martensite phase and greater than or equal to about 15 vol. % to less than or equal to about 30 vol. % of the retained austenite phase.

In one aspect, the first layer may further include a martensite phase. For example, the first layer may include less than or equal to about 5 vol. % of the martensite phase.

In one aspect, the first layer may have an ultimate tensile strength that is greater than an ultimate tensile strength of the second, third, fourth, fifth, sixth, and seventh layers.

In one aspect, the first layer may include greater than or equal to about 0.2 weight percent to less than or equal to about 0.5 wt. % of carbon, greater than or equal to about 1.5 wt. % to less than or equal to about 5 wt. % of manganese, greater than or equal to about 1 wt. % to less than or equal to about 3 wt. % of silicon, greater than or equal to about 0.1 wt. % to less than or equal to about 1.5 wt. % of aluminum, and a balance of iron.

In one aspect, the second and third layers may further include a martensite phase. For example, the second and third layers may each include greater than or equal to about 30 vol. % to less than or equal to about 40 vol. % of the martensite phase.

In one aspect, the second and third layers may further include a bainite/tempered martensite phase and a retained austenite phase. The second and third layers may each include less than or equal to about 20 vol. % of the bainite/tempered martensite phase and less than or equal to about 5 vol. % of the retained austenite phase.

In one aspect, the second and third layers may each include less than or equal to about 0.15 wt. % of carbon, greater than or equal to about 1 wt. % to less than or equal to about 2 wt. % of manganese, greater than or equal to about 0.2 wt. % to less than or equal to about 1 wt. % of silicon, greater than or equal to about 0.1 wt. % to less than or equal to about 0.5 wt. % of aluminum, and a balance of iron.

In one aspect, the fourth and fifth layers may further include a martensite phase. For example, the fourth and fifth layers may include greater than or equal to about 10 vol. % to less than or equal to about 30 vol. % of the martensite phase.

In one aspect, the fourth and fifth layers may each include less than or equal to about 0.1 wt. % of carbon, greater than or equal to about 0.5 wt. % to less than or equal to about 1.5 wt. % of manganese, greater than or equal to about 0.1 wt. % to less than or equal to about 0.5 wt. % of silicon, greater than or equal to about 0.1 wt. % to less than or equal to about 0.5 wt. % of aluminum, and a balance of iron.

In one aspect, the sixth and seventh layers may each have a total elongation that is larger than the total elongation of the first, second, third, fourth, and fifth layers.

In one aspect, the sixth and seventh layers may each include less than or equal to about 0.02 wt. % of carbon, less than or equal to about 0.5 wt. % of manganese, less than or equal to about 0.1 wt. % of silicon, less than or equal to about 0.1 wt. % of aluminum, and a balance of iron.

In one aspect, an overall thickness of the gradient steel may be represented by t, where the first layer may have an average thickness of about 0.6(t), the second and third layers may have average thicknesses of about 0.2(t), the fourth and fifth layers may have average thicknesses of about 0.15(t), and the sixth and seventh layers may have average thicknesses of about 0.05(t).

In various aspects, the present disclosure provides a gradient steel. The gradient steel may include a central high-retained austenite layer having a first surface, a first low-retained austenite layer disposed adjacent to the first surface of the central high-retained austenite layer, a second low-retained austenite layer disposed adjacent to the second surface of the central high-retained austenite layer, a first lean-chemistry, low-martensite layer disposed adjacent to a surface of the first low-retained austenite layer that faces away from the central high-retained austenite layer, a second lean-chemistry, low-martensite layer disposed adjacent to a surface of the second low-retained austenite layer that faces away from the central high-retained austenite layer, a first ferritic layer disposed adjacent to a surface of the first lean-chemistry, low-martensite layer that faces away from the central high-retained austenite layer, and a second ferritic layer disposed adjacent to a surface of the second lean-chemistry, low-martensite layer that faces away from the central high-retained austenite layer. The central high-retained austenite layer may include a first amount of carbon. The first and second low-retained austenite layers may each include a second amount of carbon, where the second amount of carbon is less than the first amount of carbon. The first lean-chemistry, low-martensite layer and the second lean-chemistry, low-martensite layer may each include a third amount of carbon, where the third amount of carbon is less than the second amount of carbon. The first ferritic layer and the second ferritic layer may each include a fourth amount of carbon, where the fourth amount of carbon being less than the third amount of carbon.

In one aspect, the central high-retained austenite layer may include a bainite/tempered martensite phase and a retained austenite phase. For example, the central high-retained austenite layer may include greater than or equal to about 50 vol. % to less than or equal to about 70 vol. % of the bainite/tempered martensite phase and greater than or equal to about 15 vol. % to less than or equal to about 30 vol. % of the retained austenite phase.

In one aspect, the first and second low-retained austenite layers may each include a ferrite phase in a first ferrite volume, the first and second lean-chemistry, low-martensite layers may each include a ferrite phase in a second ferrite volume, and the first and second ferritic layers may each include a ferrite phase in a third ferrite volume, where the third ferrite volume is greater than the second ferrite volume and the second ferrite volume is greater than the first ferrite volume.

In various aspects, the present disclosure provides a gradient steel. The gradient steel may include a central high-retained austenite layer having a first surface and a second surface parallel with the first surface, a first low-retained austenite layer disposed adjacent to the first surface of the first layer, a second low-retained austenite layer disposed adjacent to the second surface of the first layer, a first lean-chemistry, low-martensite layer disposed adjacent to a surface of the first low-retained austenite layer that faces away from the central high-retained austenite layer, a second lean-chemistry, low-martensite layer disposed adjacent to a surface of the second low-retained austenite layer that faces away from the central high-retained austenite layer, a first ferritic layer disposed adjacent to a surface of the first lean-chemistry, low-martensite layer that faces away from the central high-retained austenite layer, and a second ferritic layer disposed adjacent to a surface of the second lean-chemistry, low-martensite layer that faces away from the central high-retained austenite layer. The first layer may include a greater than or equal to about 50 vol. % to less than or equal to about 70 vol. % of a bainite/tempered martensite phase volume and greater than or equal to about 15 vol. % to less than or equal to about 30 vol. % of a retained austenite phase volume. The first and second low-retained austenite layers may each include greater than or equal to about 30 vol. % to less than or equal to about 40 vol. % of a first ferrite phase volume and greater than or equal to about 30 vol. % to less than or equal to about 40 vol. % of a first martensite phase volume. The first lean-chemistry, low-martensite layer and the second lean-chemistry, low-martensite layer may each include greater than or equal to about 70 vol. % to less than or equal to about 90 vol. % of a second ferrite phase volume and greater than or equal to about 90 vol. % of a second martensite phase volume. The first ferritic layer and the second ferritic layer each include about 100 vol. % of a third ferrite phase volume.

Further areas of applicability will become apparent from the description provided herein. The description and specific examples in this summary are intended for purposes of illustration only and are not intended to limit the scope of the present disclosure.

BRIEF DESCRIPTION OF THE DRAWING

The drawing described herein is for illustrative purposes only of selected embodiments and not all possible implementations, and are not intended to limit the scope of the present disclosure.

FIG. 1 illustrates an example high strength gradient steel in accordance with various aspects of the present disclosure.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected, or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the FIGURE. Spatially or temporally relative terms may be intended to encompass different orientations of the device or system in use or operation in addition to the orientation depicted in the FIGURE.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates both exactly or precisely the stated numerical value, and also, that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawing.

In various aspects, the present disclosure provides high-strength, high-ductility, high-bendability steel sheets. The steel sheets may be used to form components or articles using, for example, roll forming processes. The steel sheets may be used to form components or articles of an automobile or other vehicles (e.g., motorcycles, boats, tractors, buses, motorcycles, mobile homes, campers, and tanks), but they may also be used in a variety of other industries and applications, including aerospace components, consumer goods, devices, buildings (e.g., houses, offices, sheds, warehouses), office equipment and furniture, and industrial equipment machinery, agricultural or farm equipment, or heavy machinery, by way of non-limiting example. Non-limiting examples of automotive components or articles include hoods, pillars (e.g., A-pillars, hinge pillars, B-pillars, C-pillars, and the like), panels, including structural panels, door panels, and door components, interior floors, floor pans, roofs, exterior surfaces, underbody shields, wheels, control arms and other suspension, crush cans, bumpers, structural rails and frames, cross car beams, undercarriage or drive train components, and the like.

In various aspects, the steel sheets may be gradient sheets having, for example, two or more different layers (or sections or portions or areas) having different compositions and also microstructures. For example, as illustrated in FIG. 1, in certain variations, an example steel sheet 100 may include a center layer (also referred to as a central high-retained austenite layer) 110 disposed between one or more other layers. The one or more other layers may include, for example, two low-retained austenite layers 120, 130, two low-martensite layers (also referred to as lean-chemistry, low-martensite layers) 140, 150, and/or two pure layers (also referred to as pure ferritic layers and/or ferritic layers) 160, 170. For example, in certain variations, a first low-retained austenite layer 120 may be disposed on or near or adjacent to a first surface 112 of the central high-retained austenite layer 110, a second low-retained austenite layer 130 may be disposed on or near or adjacent to a second surface 114 of the central high-retained austenite layer 110, a first lean-chemistry, low-martensite layer 140 may be disposed on or near or adjacent to a surface 122 of the first low-retained austenite layer 120 facing away from the central high-retained austenite layer 110, a second lean-chemistry, low-martensite layer 150 may be disposed on or near or adjacent to a surface 132 of the second low-retained austenite layer 130 facing away from the central high-retained austenite layer 110, a first pure ferritic layer 160 may be disposed on or near or adjacent to a surface 142 of the first lean-chemistry, low-martensite layer 140 facing away from the central high-retained austenite layer 110, and a second pure ferritic layer 170 may be disposed on or near or adjacent to a surface 152 of the second lean-chemistry, low-martensite layer 150 facing away from the central high-retained austenite layer 110. Although not illustrated it should be recognized that, in certain variations, one or more optional coatings may be disposed on or near or adjacent to exposed surfaces of the first pure ferritic layer 160 and/or the second pure ferritic layer 170 facing away from the first lean-chemistry, low-martensite layer 140 and second lean-chemistry, low-martensite layer 150, respectively. The one or more optional coatings may provide, for example, corrosion resistance and/or other protection of the steel 100. The second surface 114 of the central high-retained austenite layer 110 may be substantially parallel with the first surface 112 of the central high-retained austenite layer 110. The surface 122 of the first low-retained austenite layer 120 and the surface 142 of the first lean-chemistry, low-martensite layer 150 may be substantially parallel with the first surface 112 of the central high-retained austenite layer. The surface 132 of the second low-retained austenite layer 130 and the surface 152 of the first lean-chemistry, low-martensite layer 150 may be substantially parallel with the second surface 114 of the central high-retained austenite layer 110.

The central high-retained austenite layer 110 may be formed from a first steel alloy that includes carbon, manganese, silicon, and/or aluminum and iron. The central high-retained austenite layer 110 may include amounts of carbon, manganese, and silicon that are larger than amounts of the same as included in the two low-retained austenite layers 120, 130, two lean-chemistry, low-martensite layers 140, 150, and/or two pure ferritic layers 160, 170. For example, in certain variations, the first steel alloy may include greater than or equal to about 0.2 weight percent (wt. %) to less than or equal to about 0.5 wt. % of carbon, greater than or equal to about 1.5 wt. % to less than or equal to about 5 wt. % of manganese, greater than or equal to about 1 wt. % to less than or equal to about 3 wt. % of silicon, greater than or equal to about 0.1 wt. % to less than or equal to about 1.5 wt. % of aluminum, and a balance of iron. In certain variations, the first steel alloy may consist essentially of greater than or equal to about 0.2 wt. % to less than or equal to about 0.5 wt. % of carbon, greater than or equal to about 1.5 wt. % to less than or equal to about 5 wt. % of manganese, greater than or equal to about 1 wt. % to less than or equal to about 3 wt. % of silicon, greater than or equal to about 0.1 wt. % to less than or equal to about 1.5 wt. % of aluminum, and a balance of iron. In certain variations, the first steel alloy may consist of greater than or equal to about 0.2 wt. % to less than or equal to about 0.5 wt. % of carbon, greater than or equal to about 1.5 wt. % to less than or equal to about 5 wt. % of manganese, greater than or equal to about 1 wt. % to less than or equal to about 3 wt. % of silicon, greater than or equal to about 0.1 wt. % to less than or equal to about 1.5 wt. % of aluminum, and a balance of iron.

The central high-retained austenite layer 110 provides bulk strength and ductility. For example, the central high-retained austenite layer 110 may be a high-strength layer having an ultimate tensile strength (UTS) that is greater than ultimate tensile strengths of the one or more other layers, including the first and second low-retained austenite layers 120, 130, the first and second lean-chemistry, low-martensite layers 140, 150, and the first and second pure ferritic layers 160, 170. The ultimate tensile strength of the central high-retained austenite layer 110 may be greater than or equal to about 1,650 megapascals (MPa) to less than or equal to about 1,750 MPa. In certain variations, the central high-retained austenite layer 110 may have a uniform elongations (UE) that is greater than or equal to about 4 MPa to less than or equal to about 15 MPa, and a total elongation (TE) that is greater than or equal to about 10 to less than or equal to about 20 MPa.

The microstructure of the central high-retained austenite layer 110 may include a mixture of bainite/tempered martensite and retained austenite phases, where the bainite/tempered martensite phase is associated with high strength and the retained austenite is associated with high ductility and toughness. The central high-retained austenite layer 110 may include greater than or equal to about 50 volume percent (vol. %) to less than or equal to about 70 vol. % of the bainite/tempered martensite phase and less than or equal or equal to about 15 vol. % to less than or equal to about 30 vol. % of the retained austenite phase. In certain variations, the central high-retained austenite layer 110 may also include greater than or equal to 0 vol. % to less than or equal to about 5 vol. % of a ferrite phase and/or greater than or equal to 0 vol. % to less than or equal to about 5 vol. % of a martensite phase.

The first low-retained austenite layer 120 may be the same as or different from the second low-retained austenite layer 130. In certain variations, as illustrated, the first low-retained austenite layer 120 and/or the second low-retained austenite layer 130 may be substantially continuous layers covering, for example, greater than or equal to about 85%, optionally greater than or equal to about 90%, optionally greater than or equal to about 95%, optionally greater than or equal to about 98%, optionally greater than or equal to about 99%, and in certain aspects, optionally greater than or equal to about 99.5%, of a total surface area of the first surface 112 of the central high-retained austenite layer 110 and the second surface 114 of the central high-retained austenite layer 110, respectively. Although illustrated as substantially continuous layers, it should be recognized that, in certain variations, the first low-retained austenite layer 120 and/or the second low-retained austenite layer 130 may be discontinuous layers. In each variation, the first low-retained austenite layer 120 and second low-retained austenite layer 130 is each formed from a second steel alloy that includes, for example, carbon, manganese, silicon, and/or aluminum and iron.

Amounts of carbon, manganese, and silicon as included in the first low-retained austenite layer 120 and/or the second low-retained austenite layer 130 may be smaller than amounts of the same as included in the central high-retained austenite layer 110. For example, in certain variations, the second steel alloy may include greater than or equal to about 0 wt. % to less than or equal to about 0.15 wt. % of carbon, greater than or equal to about 1 wt. % to less than or equal to about 2 wt. % of manganese, greater than or equal to about 0.2 wt. % to less than or equal to about 1 wt. % of silicon, greater than or equal to about 0.1 wt. % to less than or equal to about 0.5 wt. % of aluminum, and a balance of iron. In certain variations, the second steel may consist essentially of greater than or equal to about 0 wt. % to less than or equal to about 0.15 wt. % of carbon, greater than or equal to about 1 wt. % to less than or equal to about 2 wt. % of manganese, greater than or equal to about 0.2 wt. % to less than or equal to about 1 wt. % of silicon, greater than or equal to about 0.1 wt. % to less than or equal to about 0.5 wt. % of aluminum, and a balance of iron. In certain variations, the second steel may consist of greater than or equal to about 0 wt. % to less than or equal to about 0.15 wt. % of carbon, greater than or equal to about 1 wt. % to less than or equal to about 2 wt. % of manganese, greater than or equal to about 0.2 wt. % to less than or equal to about 1 wt. % of silicon, greater than or equal to about 0.1 wt. % to less than or equal to about 0.5 wt. % of aluminum, and a balance of iron.

The first and second low-retained austenite layers 120, 130 provide good weld toughness and bendability, as well as hole expansion (HE).

Weld toughness refers to the energy absorbed by a weld prior to failure, and in certain variations, can be defined by a ratio of tensile shear strength of the weld to axial tensile strength of the material. The first and second low-retained austenite layers 120, 130 may have weld toughnesses that are greater than the weld toughness of the central high-retained austenite layer 110. For example, in certain variations, the first and second low-retained austenite layers 120, 130 may have weld toughnesses greater than or equal to about 0.5 to less than or equal to about 0.8, while the central high-retained austenite layer 110 has a weld toughness greater than or equal to about 0.2 to less than or equal to about 0.5.

Bendability can be defined as a radius of a bending tool (r) over the thickness of the layer (t). The first and second low-retained austenite layers 120, 130 may have bendabilities that are greater than the bendability of the central high-retained austenite layer 110. For example, in certain variations, the first and second low-retained austenite layers 120, 130 may have bendabilities greater than or equal to about 1 to less than or equal to about 7, while the central high-retained austenite layer 110 has a bendability greater than 0 to less than or equal to about 1.

Hole expansion (HE) is a measure of formability, specifically stretch frangibility of a steel or its resistance to cracking during stretch flanging operation. Hole expansion (HE) is quantified using hole expansion ratios (HER) measured using ISO 16630. The first and second low-retained austenite layers 120, 130 may have hole expansion ratios that are the same as or different from the central high-retained austenite layer 110. For example, in certain variations, the first and second low-retained austenite layers 120, 130 may have hole expansion ratios greater than or equal to about 20% to less than or equal to about 40%, while the central high-retained austenite layer 110 has a hole expansion ratio greater than 0% to less than or equal to about 25%.

The first and second low-retained austenite layers 120, 130 may have uniform elongations that are greater than a uniform elongation of the central high-retained austenite layer 110. For example, the first and second low-retained austenite layers 120, 130 may each have a uniform elongation greater than or equal to about 15 MPa to less than or equal to about 25 MPa.

The first and second low-retained austenite layers 120, 130 may also have a total elongation (TE) that are greater than a total elongation (TE) of the central high-retained austenite layer 110. For example, the first and second low-retained austenite layers 120, 130 may each have a total elongation (TE) greater than or equal to about 25 MPa to less than or equal to about 35 MPa.

The first and second low-retained austenite layers 120, 130 may have ultimate tensile strengths that are less than the ultimate tensile strength of the central high-retained austenite layer 110. For example, the first and second low-retained austenite layers 120, 130 may each have an ultimate tensile strength greater than or equal to about 950 MPa to less than or equal to about 1,050 MPa.

The microstructure of the first and second low-retained austenite layers 120, 130 may include a mixture of ferrite and martensite phases, where the ferrite phase is associated with high ductility and the martensite phase is associated with high strength. The first and second low-retained austenite layers 120, 130 may include an amount of the ferrite phase that is larger than an amount of the ferrite phase as included in the central high-retained austenite layer 110. For example, the first and second low-retained austenite layers 120, 130 may include greater than or equal to about 30 vol. % to less than or equal to about 40 vol. % of a ferrite phase and greater than or equal to about 30 vol. % to less than or equal to about 40 vol. % of a martensite phase. In certain variations, the first low-retained austenite layer 120 and/or the second low-retained austenite layer 130 may also include greater than or equal to about 0 vol. % to less than or equal to about 20 vol. % of a bainite/tempered martensite phase and/or greater than or equal to about 0 vol. % to less than or equal to about 5 vol. % of a retained austenite phase.

The first lean-chemistry, low-martensite layer 140 may be the same as or different from the second lean-chemistry, low-martensite layer 150. In certain variations, as illustrated, the first lean-chemistry, low-martensite layer 140 and/or the second lean-chemistry, low-martensite layer 150 may be substantially continuous layers covering, for example, greater than or equal to about 85%, optionally greater than or equal to about 90%, optionally greater than or equal to about 95%, optionally greater than or equal to about 98%, optionally greater than or equal to about 99%, and in certain aspects, optionally greater than or equal to about 99.5%, of a total surface area of the surface 122 of the first low-retained austenite layer 120 and the surface 132 of the second low-retained austenite layer 130, respectively. Although illustrated as substantially continuous layers, it should be recognized that, in certain variations, the first lean-chemistry, low-martensite layer 140 and/or the second lean-chemistry, low-martensite layer 150 may be discontinuous layers. In each variation, the first lean-chemistry, low-martensite layer 140 and the second lean-chemistry, low-martensite layer 150 are each formed from a third steel alloy that includes, for example, carbon, manganese, silicon, and/or aluminum and iron.

Amounts of carbon, manganese, and silicon as included in the first lean-chemistry, low-martensite layer 140 and/or the second lean-chemistry, low-martensite layer 150 may be smaller than amounts of the same as included in the first low-retained austenite layer 120 and/or the second low-retained austenite layer 130. For example, in certain variations, the third steel alloy may include greater than or equal to about 0 wt. % to less than or equal to about 0.1 wt. % of carbon, greater than or equal to about 0.5 wt. % to less than or equal to about 1.5 wt. % of manganese, greater than or equal to about 0.1 wt. % to less than or equal to about 0.5 wt. % of silicon, greater than or equal to about 0.1 wt. % to less than or equal to about 0.5 wt. % of aluminum, and a balance of iron. In certain variations, the third steel alloy may consist essentially of greater than or equal to about 0 wt. % to less than or equal to about 0.1 wt. % of carbon, greater than or equal to about 0.5 wt. % to less than or equal to about 1.5 wt. % of manganese, greater than or equal to about 0.1 wt. % to less than or equal to about 0.5 wt. % of silicon, greater than or equal to about 0.1 wt. % to less than or equal to about 0.5 wt. % of aluminum, and a balance of iron. In certain variations, the third steel alloy may consist of greater than or equal to about 0 wt. % to less than or equal to about 0.1 wt. % of carbon, greater than or equal to about 0.5 wt. % to less than or equal to about 1.5 wt. % of manganese, greater than or equal to about 0.1 wt. % to less than or equal to about 0.5 wt. % of silicon, greater than or equal to about 0.1 wt. % to less than or equal to about 0.5 wt. % of aluminum, and a balance of iron.

The first and second lean-chemistry, low-martensite layers 140, 150 provide good bendability, as well as liquid metal embrittlement propagation and hole expansion.

The first and second lean-chemistry, low-martensite layers 140, 150 may have a weld toughnesses that are greater than the weld toughnesses of the first and second low-retained austenite layers 120, 130. For example, in certain variations, the first and second lean-chemistry, low-martensite layers 140, 150 may have weld toughnesses greater than or equal to about 0.7 to less than or equal to about 0.9.

The first and second lean-chemistry, low-martensite layers 140, 150 may have bendabilities that are the same as or different from the bendability of the first and second low-retained austenite layers 120, 130. For example, in certain variations, the first and second lean-chemistry, low-martensite layers 140, 150 may have bendabilities greater than or equal to about 1 to less than or equal to about 7.

The first and second lean-chemistry, low-martensite layers 140, 150 may have hole expansion ratios that are greater than the hole expansion ratios of the first and second low-retained austenite layers 120, 130. For example, in certain variations, the first and second lean-chemistry, low-martensite layers 140, 150 may have hole expansion ratios greater than or equal to about 30% to less than or equal to about 50%.

The first and second lean-chemistry, low-martensite layers 140, 150 may have uniform elongations that are greater than the uniform elongation of the central high-retained austenite layer 110. The uniform elongation of the first and second lean-chemistry, low-martensite layers 140, 150 may be the same as or different form the uniform elongation of the first low-retained austenite layer 120 and/or the uniform elongation of the second low-retained austenite layer 130. For example, the first and second lean-chemistry, low-martensite layers 140, 150 may have uniform elongations that are greater than the uniform elongations of the first and second low-retained austenite layers 120, 130. In certain variations, the first and second lean-chemistry, low-martensite layers 140, 150 may each have a uniform elongation greater than or equal to about 20 MPa to less than or equal to about 30 MPa.

The first and second lean-chemistry, low-martensite layers 140, 150 may each have a total elongation (TE) that is greater than the total elongation (TE) of the central high-retained austenite layer 110 and also the total elongation (TE) of the first low-retained austenite layer 120 and the total elongation (TE) of the second low-retained austenite layer 130. For example, the first and second lean-chemistry, low-martensite layers 140, 150 may each have a total elongation (TE) greater than or equal to about 35 MPa to less than or equal to about 54 MPa.

The first and second lean-chemistry, low-martensite layers 140, 150 may have ultimate tensile strengths that are less than the ultimate tensile strength of the central high-retained austenite layer and also the ultimate tensile strength of the first low-retained austenite layer 120 and the ultimate tensile strength of the second low-retained austenite layer 130. For example, the first and second lean-chemistry, low-martensite layers 140, 150 may each have an ultimate tensile strength greater than or equal to about 350 MPa to less than or equal to about 450 MPa.

The microstructure of the first and second lean-chemistry, low-martensite layers 140, 150 may include a mixture of ferrite and martensite phases, where the ferrite phase is associated with low strength, liquid metal embrittlement resistance, high ductility, and/or hole expansion, and the martensite phase is associated with high strength. The first and second lean-chemistry, low-martensite layers 140, 150 may include an amount of the ferrite phase that is larger than an amount of the ferrite phase as included in the first and second low-retained austenite layers 120, 130. For example, the first and second lean-chemistry, low-martensite layers 140, 150 may include greater than or equal to about 70 vol. % to less than or equal to about 90 vol. % of the ferrite phase and greater than or equal to about 10 vol. % to less than or equal to about 30 vol. %, of the martensite phase. The first and second lean-chemistry, low-martensite layers 140, 150 may have a fine grain size as compared to the central high-retained austenite layer 110 and also the first and second low-retained austenite layers 120, 130 and the first and second pure ferritic layers 160, 170. For example, the first and second lean-chemistry, low-martensite layers 140, 150 may have an average grain size greater than or equal to about 1 micrometer ($\mu$m) to less than or equal to about 20 $\mu$m.

The first pure ferritic layer 160 may be the same as or different from the second pure ferritic layer 170. In certain variations, as illustrated, the first pure ferritic layer 160 and/or the second pure ferritic layer 170 may be substantially continuous layers covering, for example, greater than or equal to about 85%, optionally greater than or equal to about 90%, optionally greater than or equal to about 95%, optionally greater than or equal to about 98%, optionally greater than or equal to about 99%, and in certain aspects, optionally greater than or equal to about 99.5%, of a total surface area of the surface 142 of the first lean-chemistry, low-martensite layer 140 and the surface 152 of the second lean-chemistry, low-martensite layer 150, respectively. Although illustrated as substantially continuous layers, it should be recognized that, in certain variations, the first pure ferritic layer 160 and/or the second pure ferritic layer 170 may be discontinuous layers. In each variation, the first pure ferritic layer 160 and the second pure ferritic layer 170 is each formed from a fourth steel alloy that includes, for example, carbon, manganese, silicon, and/or aluminum and iron.

In certain variations, the fourth steel alloy includes greater than or equal to about 0 wt. % to less than or equal to about 0.02 wt. % of carbon, greater than or equal to about 0 wt. % to less than or equal to about 0.5 wt. % of manganese, greater than or equal to about 0 wt. % to less than or equal to about 0.1 wt. % of silicon, greater than or equal to about 0 wt. % to less than or equal to about 0.1 wt. % of aluminum, and a balance of iron. In certain variations, the fourth steel alloy consists essentially of greater than or equal to about 0 wt. % to less than or equal to about 0.02 wt. % of carbon, greater than or equal to about 0 wt. % to less than or equal to about 0.5 wt. % of manganese, greater than or equal to about 0 wt. % to less than or equal to about 0.1 wt. % of silicon, greater than or equal to about 0 wt. % to less than or equal to about 0.1 wt. % of aluminum, and a balance of iron. In certain variations, the fourth steel alloy consists of greater than or equal to about 0 wt. % to less than or equal to about 0.02 wt. % of carbon, greater than or equal to about 0 wt. % to less than or equal to about 0.5 wt. % of manganese, greater than or equal to about 0 wt. % to less than or equal to about 0.1 wt. % of silicon, greater than or equal to about 0 wt. % to less than or equal to about 0.1 wt. % of aluminum, and a balance of iron. Amounts of carbon, manganese, and silicon as included in the first pure ferritic layer 160 and/or the second pure ferritic layer 170 may be smaller than amounts of the same as included in the first lean-chemistry, low-martensite layer 140 and/or the second lean-chemistry, low-martensite layer 150.

The first and second pure ferritic layers 160, 170 provide good liquid metal embrittlement propagation and hole expansion.

Liquid metal embrittlement refers to the premature failure of zinc-coated sheets as a result of liquid zinc-induced cracking at elevated temperature during welding. The first and second pure ferritic layers 160, 170 are highly resistant to liquid metal embrittlement, while the first and second lean-chemistry, low-martensite layers 140, 150 function as crack arresters, slowing down crack propagation rate and does not allow the cracks to propagate to the first and second low-retained austenite layers 120, 130 and/or the central high-retained austenite layer 110.

The first and second pure ferritic layers 160, 170 may have weld toughnesses that are greater than or equal to the weld toughnesses of the first and second lean-chemistry, low-martensite layers 140, 150. For example, in certain variations, the first and second pure ferritic layers 160, 170 may have weld toughnesses greater than or equal to about 0.8 to less than or equal to about 1.

The first and second pure ferritic layers 160, 170 may have bendabilities that are the same as or different from the first and second lean-chemistry, low-martensite layers 140, 150 and/or the first and second low-retained austenite layers 120, 130 and/or the central high-retained austenite layer 110. For example, in certain variations, the first and second pure ferritic layers 160, 170 may have bendabilities greater than 1 to less than or equal to about 2.

The first and second pure ferritic layers 160, 170 may have hole expansion ratios that are greater than the first and second lean-chemistry, low-martensite layers 140, 150. For example, in certain variations, the first and second pure ferritic layers 160, 170 may have hole expansion ratios greater than or equal to about 60% to less than or equal to about 100%.

The first and second pure ferritic layers 160, 170 may have uniform elongations that are greater than the uniform elongation of the central high-retained austenite layer. The uniform elongation of the first and second pure ferritic layers 160, 170 may be the same as or different from the uniform elongation of the first low-retained austenite layer 120 and/or the uniform elongation of the second low-retained austenite layer 130 and/or the uniform elongation of the first lean-chemistry, low-martensite layer 140 and/or the uniform elongation of the second lean-chemistry, low-martensite layer 150. For example, the first and second pure ferritic layers 160, 170 may each have a uniform elongation greater than or equal to about 25 MPa to less than or equal to about 35 MPa.

The first and second pure ferritic layers 160, 170 may each have a total elongation (TE) that is greater than the total elongation (TE) of the central high-retained austenite layer 110 and also the total elongation (TE) of the first low-retained austenite layer 120, the total elongation (TE) of the second low-retained austenite layer 130, the total elongation (TE) of the first lean-chemistry, low-martensite layer 140, and the total elongation (TE) of the second lean-chemistry, low-martensite layer 150. For example, the first and second pure ferritic layers 160, 170 may each have a total elongation (TE) greater than or equal to about 45 MPa to less than or equal to about 55 MPa.

The first and second pure ferritic layer 160, 170 may have ultimate tensile strengths that are less than the ultimate tensile strength of the central high-retained austenite layer and also the ultimate tensile strength of the first low-retained austenite layer 120, the ultimate tensile strength of the second low-retained austenite layer 130, the ultimate tensile strength of the first lean-chemistry, low-martensite layer 140, and the ultimate tensile strength of the second lean-chemistry, low-martensite layer 150. For example, the first and second pure ferritic layer 160, 170 may be low strength each having an ultimate tensile strength greater than or equal to about 150 MPa to less than or equal to about 250 MPa.

The microstructure of the first and second pure ferritic layers 160, 170 may include a single phase. For example, in certain variations, the first and second pure ferritic layers 160, 170 may include 100 vol. % of a ferrite phase. The first and second pure ferritic layers 160, 170 may have a large grain size as compared to the central high-retained austenite layer 110 and also the first and second low-retained austenite layers 120, 130 and the first and second lean-chemistry, low-martensite layers 140, 150. For example, in certain variations, the first and second pure ferritic layers 160, 170 may have an average grain size greater than or equal to about 2 μm to less than or equal to about 50 μm.

In certain variations, the steel sheet 100 may have an overall thickness (t), while an average thickness of the central high-retained austenite layer 110 may be about sixty percent of the overall thickness of the steel sheet 100; average thicknesses of the first and second low-retained austenite layers 120, 130 may be about twenty percent of the overall thickness of the steel sheet 100; average thicknesses of the first and second lean-chemistry, low-martensite layers 140, 150 may be about fifteen percent of the overall thickness of the steel sheet 100; and the average thicknesses of the first and second pure ferritic layers 160, 170 may be about five percent of the overall thickness of the steel sheet 100. For example, the average thickness of the central high-retained austenite layer 110 may be represented by 0.6(t), the average thicknesses of the first and second low-retained austenite layers 120, 130 may represented by 0.2(t); the average thicknesses of the first and second lean-chemistry, low-martensite layers 140, 150 may be represented by 0.15(t); and the average thicknesses of the first and second pure ferritic layers 160, 170 may be represented by 0.05(t).

In certain variations, the overall thickness (t) of the steel sheet 100 may be greater than or equal to about 0.5 millimeters (mm) to less than or equal to about 5 mm, where the central high-retained austenite layer 110 has an average thickness greater than or equal to about 0.3 mm to less than or equal to about 3 mm, the first low-retained austenite layer 120 has an average thickness greater than or equal to about 0.1 mm to less than or equal to about 1 mm, the second low-retained austenite layer 130 has an average thickness greater than or equal to about 0.1 mm to less than or equal to about 1 mm, the first lean-chemistry, low-martensite layer 140 has an average thickness greater than or equal to about 0.075 mm to less than or equal to about 0.75 mm, the second lean-chemistry, low-martensite layer 150 has an average thickness greater than or equal to about 0.075 mm to less than or equal to about 0.75 mm, the first pure ferritic layer 160 has an average thickness greater than or equal to about 0.025 mm to less than or equal to about 0.25 mm, and the second pure ferritic layer 170 has an average thickness greater than or equal to about 0.025 mm to less than or equal to about 0.25 mm.

In various aspects, the present disclosure provides methods for forming a high strength gradient steel, like the steel sheet illustrated in FIG. 1. In various aspects, an example method may include annealing a cold rolled sheet having a composition like the central high-retained austenite layer 110 illustrated in FIG. 1. In certain variations, the cold rolled sheet may have an average thickness greater than or equal to about 1 millimeter (mm) to less than or equal to about 3 millimeter (mm). Annealing the cold rolled sheet may include using an annealing furnace having a nitrogen-containing atmosphere to heat the cold rolled sheet to a first temperature greater than or equal to about 800° ° C. to less than or equal to about 1,200° C. at a heating rate of greater than or equal to about 50° C./s to less than or equal to about 100° C./s. In certain variations, the annealing process may include an isothermal soak. For example, the cold rolled sheet may be soaked in a nitrogen-containing atmosphere that also includes (e.g., about 5 vol. %) hydrogen gas ($H_2$), and where the dew point is maintained between greater than or equal to about −20° ° C. to less than or equal to about 10° C., for a first period greater than or equal to about 300 seconds (s) to less than or equal to about 5,000 seconds (s) to create through-thickness gradient, for example, varying the concentrations of carbon, manganese, and silicon, in the steel. In this manner the different layers (e.g., first and second low-retained austenite layers 120, 130, first and second lean-chemistry, low-martensite layers 140, 150, and the first and second pure ferritic layers 160, 170) may be formed from the single cold rolled sheet.

The different layers may be formed simultaneously or consecutively. For example, in certain variations, the method may include a single annealing step, where each of the layers are formed. In other variations, the method may include two or more annealing steps, where a first step prepares the first and second low-retained austenite layers 120, 130 and a second step forms the first and second lean-chemistry, low-martensite layers 140, 150 and the first and second pure ferritic layers 160, 170. In other variations, the first step may prepare the first and second low-retained austenite layers 120, 130 and the first and second lean-chemistry, low-martensite layers 140, 150 and the second step may prepare the first and second pure ferritic layers 160, 170. In still further variations, the method may include three annealing steps, where a first step prepares the first and second low-retained austenite layers 120, 130, a second step prepares the first and second lean-chemistry, low-martensite layers 140, 150, and the third step prepares the first and second pure ferritic layers 160, 170. In certain variations the annealing step that forms each of the layers may extend for a period that is longer than a period required for the individual steps of the two-step or three-step annealing processes.

In each variations, the methods for forming a high strength gradient steel, like the steel sheet illustrated in FIG. 1, may further include quenching the annealed steel to a second temperature greater than or equal to about 100° C. to less than or equal to about 450° C. and holding the heated steel isothermally for a second period greater than or equal to about 3 seconds (s) to less than or equal to about 100 seconds (s) to form the desired microstructure including, for example, the mixture of bainite/tempered martensite and retained austenite phases of the central high-retained austenite layer 110, the mixture of ferrite and martensite phases of the first and second low-retained austenite layers 120, 130, the mixture of ferrite and martensite phases of the first and second lean-chemistry, low-martensite layers 140, 150, and the single phase of the first and second pure ferritic layers 160, 170.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A gradient steel having an overall thickness represented by t and comprising:
    a first layer having a first surface and a second surface parallel with the first surface, the first layer being a continuous layer comprising ferrite phase in a first volume less than or equal to about 5 vol. % and having a thickness of about 0.6(t);
    a second layer disposed adjacent to the first surface of the first layer; and
    a third layer disposed adjacent to the second surface of the first layer,
    the second and third layers each being a continuous layer comprising ferrite phase in a second volume greater than or equal to about 30 vol. % to less than or equal to about 40 vol. % and having a thickness of about 0.2(t).

2. The gradient steel of claim 1, wherein the gradient steel further comprises:
    a fourth layer disposed adjacent to a surface of the second layer that faces away from the first layer; and
    a fifth layer disposed adjacent to a surface of the third layer that faces away from the first layer,
    the fourth and fifth layers each being a continuous layer comprising ferrite phase in a third volume greater than or equal to about 70 vol. % to less than or equal to about 90 vol. % and having a thickness of about 0.15(t).

3. The gradient steel of claim 2, wherein the gradient steel further comprises:
    a sixth layer disposed adjacent to a surface of the fourth layer that faces away from the first layer; and
    a seventh layer disposed adjacent to a surface of the fifth layer that faces away from the first layer,
    the sixth and seventh layers each being a continuous layer comprising ferrite phase in a fourth volume that is about 100 vol. % and having a thickness of about 0.05(t).

4. The gradient steel of claim 3, wherein the first layer further comprises a bainite/tempered martensite phase and a retained austenite phase, the first layer comprising greater than or equal to about 50 vol. % to less than or equal to about 70 vol. % of the bainite/tempered martensite phase and greater than or equal to about 15 vol. % to less than or equal to about 30 vol. % of the retained austenite phase.

5. The gradient steel of claim 4, wherein the first layer further comprises a martensite phase, the first layer comprising greater than 0 vol. % to less than or equal to about 5 vol. % of the martensite phase.

6. The gradient steel of claim 4, wherein the first layer has an ultimate tensile strength that is greater than an ultimate tensile strength of the second, third, fourth, fifth, sixth, and seventh layers.

7. The gradient steel of claim 4, wherein the first layer comprises:
    greater than or equal to about 0.2 weight percent to less than or equal to about 0.5 wt. % of carbon;
    greater than or equal to about 1.5 wt. % to less than or equal to about 5 wt. % of manganese;
    greater than or equal to about 1 wt. % to less than or equal to about 3 wt. % of silicon;
    greater than or equal to about 0.1 wt. % to less than or equal to about 1.5 wt. % of aluminum; and
    a balance of iron.

8. The gradient steel of claim 3, wherein the second and third layers further comprise a martensite phase, the second and third layers each comprising greater than or equal to about 30 vol. % to less than or equal to about 40 vol. % of the martensite phase.

9. The gradient steel of claim 8, wherein the second and third layers further comprise a bainite/tempered martensite phase and a retained austenite phase, the second and third layers each comprising less than or equal to about 20 vol. % of the bainite/tempered martensite phase and less than or equal to about 5 vol. % of the retained austenite phase.

10. The gradient steel of claim 8, wherein the second and third layers each comprise:
    less than or equal to about 0.15 wt. % of carbon;
    greater than or equal to about 1 wt. % to less than or equal to about 2 wt. % of manganese;
    greater than or equal to about 0.2 wt. % to less than or equal to about 1 wt. % of silicon;
    greater than or equal to about 0.1 wt. % to less than or equal to about 0.5 wt. % of aluminum; and
    a balance of iron.

11. The gradient steel of claim 3, wherein the fourth and fifth layers further comprise a martensite phase, the fourth and fifth layers comprising greater than or equal to about 10 vol. % to less than or equal to about 30 vol. % of the martensite phase.

12. The gradient steel of claim 11, wherein the fourth and fifth layers each comprise:
    less than or equal to about 0.1 wt. % of carbon;
    greater than or equal to about 0.5 wt. % to less than or equal to about 1.5 wt. % of manganese;
    greater than or equal to about 0.1 wt. % to less than or equal to about 0.5 wt. % of silicon;
    greater than or equal to about 0.1 wt. % to less than or equal to about 0.5 wt. % of aluminum; and
    a balance of iron.

13. The gradient steel of claim 3, wherein the sixth and seventh layers each have a total elongation that is larger than the total elongation of the first, second, third, fourth, and fifth layers.

14. The gradient steel of claim 3, wherein the sixth and seventh layers comprise:
    less than or equal to about 0.02 wt. % of carbon;
    less than or equal to about 0.5 wt. % of manganese;
    less than or equal to about 0.1 wt. % of silicon;
    less than or equal to about 0.1 wt. % of aluminum; and
    a balance of iron.

15. A gradient steel having an overall thickness represented by t and comprising:
    a first layer having a first surface and a second surface parallel with the first surface, the first layer being a continuous layer comprising a first amount of carbon and a first ferrite volume less than or equal to about 5 vol. % and having a thickness of about 0.6(t);
    a second layer disposed adjacent to the first surface of the first layer;
    a third layer disposed adjacent to the second surface of the first layer, wherein the second and third layers each being a continuous layer comprising a second ferrite volume greater than or equal to about 30 vol. % to less than or equal to about 40 vol. %, a second amount of carbon being less than the first amount of carbon and having a thickness of about 0.2(t);
    a fourth layer disposed adjacent to a surface of the second layer that faces away from the first layer;
    a fifth layer disposed adjacent to a surface of the third layer that faces away from the first layer, the fourth and fifth layers each being a continuous layer comprising ferrite phase in a third volume greater than or equal to about 70 vol. % to less than or equal to about 90 vol. %, a third amount of carbon being less than the second amount of carbon and having a thickness of about 0.15(t);
    a sixth layer disposed adjacent to a surface of the fourth layer that faces away from the first layer; and
    a seventh layer disposed adjacent to a surface of the fifth layer that faces away from the first layer, the sixth and seventh layers each being a continuous layer comprising ferrite phase in a fourth volume that is about 100 vol. %, a fourth amount of carbon being less than the third amount of carbon and having a thickness of about 0.05(t).

16. The gradient steel of claim 15, wherein the first layer comprises a bainite/tempered martensite phase and a retained austenite phase, the first layer comprising greater than or equal to about 50 vol. % to less than or equal to about 70 vol. % of the bainite/tempered martensite phase and greater than or equal to about 15 vol. % to less than or equal to about 30 vol. % of the retained austenite phase.

17. A gradient steel having an overall thickness represented by t and comprising:
    a first layer having a first surface and a second surface parallel with the first surface, the first layer being a continuous layer and comprising less than or equal to about 5 vol. % of a first ferrite phase volume, greater than or equal to about 50 vol. % to less than or equal to about 70 vol. % of bainite/tempered martensite phase volume, and greater than or equal to about 15 vol. % to less than or equal to about 30 vol. % of a retained austenite phase volume and having a thickness of about 0.6(t);
    a second layer disposed adjacent to the first surface of the first layer;
    a third layer disposed adjacent to the second surface of the first layer, the second and third layers each being a continuous layer and comprising greater than or equal to about 30 vol. % to less than or equal to about 40 vol. % of a second ferrite phase volume and greater than or equal to about 30 vol. % to less than or equal to about 40 vol. % of a first martensite phase volume and having a thickness of about 0.2(t);
    a fourth layer disposed adjacent to a surface of the second layer that faces away from the first layer;
    a fifth layer disposed adjacent to a surface of the third layer that faces away from the first layer, the fourth and fifth layers each being a continuous layer and comprising greater than or equal to about 70 vol. % to less than or equal to about 90 vol. % of a third ferrite phase volume and greater than or equal to about 90 vol. % of a second martensite phase volume and having a thickness of about 0.15(t);
    a sixth layer disposed adjacent to a surface of the fourth layer that faces away from the first layer; and
    a seventh layer disposed adjacent to a surface of the fifth layer that faces away from the first layer, the sixth layer and the seventh layer each being a continuous layer comprising about 100 vol. % of a fourth ferrite phase volume and having a thickness of about 0.05(t).

* * * * *